(12) United States Patent
Milevski et al.

(10) Patent No.: US 10,216,474 B2
(45) Date of Patent: Feb. 26, 2019

(54) VARIABLE COMPUTING ENGINE FOR INTERACTIVE MEDIA BASED UPON USER BIOMETRICS

(71) Applicant: BRAGI GmbH, München (DE)

(72) Inventors: Veniamin Milevski, München (DE); Peter Vincent Boesen, München (DE)

(*) Notice: Subject to any disclaimer, the term of this patent is extended or adjusted under 35 U.S.C. 154(b) by 0 days.

(21) Appl. No.: 15/642,545

(22) Filed: Jul. 6, 2017

(65) Prior Publication Data

US 2018/0011682 A1    Jan. 11, 2018

Related U.S. Application Data

(60) Provisional application No. 62/359,006, filed on Jul. 6, 2016.

(51) Int. Cl.
| | |
|---|---|
| *G06F 3/01* | (2006.01) |
| *G06F 3/16* | (2006.01) |
| *G06K 9/00* | (2006.01) |
| *G09B 7/08* | (2006.01) |
| *H04R 1/10* | (2006.01) |

(52) U.S. Cl.
CPC .............. *G06F 3/165* (2013.01); *G06F 3/011* (2013.01); *G06K 9/00885* (2013.01); *H04R 1/1091* (2013.01); *A63H 2200/00* (2013.01); *G06K 2009/00939* (2013.01); *G09B 7/08* (2013.01); *H04R 2420/07* (2013.01); *H04R 2499/15* (2013.01)

(58) Field of Classification Search
CPC ......... G06K 9/00382; G06K 9/008855; G06K 9/00892; G06K 2009/00395; G06K 2009/00939; G08C 2201/61; G06F 21/32; G10H 2220/371
See application file for complete search history.

(56) References Cited

U.S. PATENT DOCUMENTS

| | | |
|---|---|---|
| 2,325,590 A | 8/1943 | Carlisle et al. |
| 2,430,229 A | 11/1947 | Kelsey |
| 3,047,089 A | 7/1962 | Zwislocki |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Jesse A Elbin
(74) *Attorney, Agent, or Firm* — Goodhue, Coleman & Owens, P.C.

(57) ABSTRACT

A system and method for implementing interactive media content is provided. Interactive media content is received for communication to a user through at least wireless earpieces. User biometrics are measured utilizing the wireless earpieces. A user condition associated with the user biometrics is determined. Branching patterns of the interactive media content are modified in response to the user condition. The interactive content may be a game or story.

18 Claims, 4 Drawing Sheets

(56) References Cited

U.S. PATENT DOCUMENTS

| | | |
|---|---|---|
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B2 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,888,701 B2 * | 11/2014 | LeBoeuf ................ G16H 40/63 600/301 |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 9,706,286 B1 * | 7/2017 | Patel ...................... H04R 1/105 |
| 9,794,722 B2 * | 10/2017 | Petrov ..................... H04S 7/304 |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |

(56) References Cited

U.S. PATENT DOCUMENTS

| | | |
|---|---|---|
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0286615 A1 | 11/2011 | Olodort et al. |
| 2012/0057740 A1 | 3/2012 | Rosal |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0163771 A1 | 6/2014 | Demeniuk |
| 2014/0185828 A1 | 7/2014 | Helbling |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0156529 A1* | 6/2015 | Peterson ............ G06Q 30/0269 725/12 |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0339300 A1* | 11/2016 | Todasco .................. H04W 4/80 |
| 2016/0360350 A1 | 12/2016 | Watson et al. |
| 2017/0078780 A1 | 3/2017 | Qian et al. |
| 2017/0111726 A1 | 4/2017 | Martin et al. |
| 2017/0155992 A1 | 6/2017 | Perianu et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI Is On Facebook (2014).

BRAGI Update—Arrival Of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready To Rumble, A Lot To Be Done Over Christmas (Dec. 22, 2014).

BRAGI Update—Memories From April—Update On Progress (Sep. 16, 2014).

BRAGI Update—Memories from May—Update On Progress—Sweet (Oct. 13, 2014).

BRAGI Update—Memories From One Month Before Kickstarter—Update On Progress (Jul. 10, 2014).

BRAGI Update—Memories From The First Month of Kickstarter—Update on Progress (Aug. 1, 2014).

BRAGI Update—Memories From The Second Month of Kickstarter—Update On Progress (Aug. 22, 2014).

BRAGI Update—New People @BRAGI—Prototypes (Jun. 26, 2014).

BRAGI Update—Office Tour, Tour To China, Tour to CES (Dec. 11, 2014).

BRAGI Update—Status On Wireless, Bits and Pieces, Testing-Oh Yeah, Timeline(Apr. 24, 2015).

BRAGI Update—The App Preview, The Charger, The SDK, BRAGI Funding and Chinese New Year (Feb. 11, 2015).

BRAGI Update—What We Did Over Christmas, Las Vegas & CES (Jan. 19, 2014).

BRAGI Update—Years of Development, Moments of Utter Joy and Finishing What We Started(Jun. 5, 2015).

BRAGI Update—Alpha 5 and Back To China, Backer Day, On Track(May 16, 2015).

BRAGI Update—Beta2 Production and Factory Line(Aug. 20, 2015).

BRAGI Update—Developer Units Shipping and Status(Oct. 5, 2015).

BRAGI Update—Developer Units Started Shipping and Status (Oct. 19, 2015).

BRAGI Update—Developer Units, Investment, Story and Status(Nov. 2, 2015).

BRAGI Update—Getting Close(Aug. 6, 2015).

BRAGI Update—On Track, Design Verification, How It Works and What's Next(Jul. 15, 2015).

BRAGI Update—Status On Wireless, Supply, Timeline and Open House@BRAGI(Apr. 1, 2015).

BRAGI Update—Unpacking Video, Reviews On Audio Perform and Boy Are We Getting Close(Sep. 10, 2015).

Healthcare Risk Management Review, "Nuance updates computer-assisted physician documentation solution" (Oct. 20, 2016).

Hoyt et. al., "Lessons Learned from Implementation of Voice Recognition for Documentation in the Military Electronic Health Record System", The American Health Information Management Association (2017).

(56) References Cited

OTHER PUBLICATIONS

Hyundai Motor America, "Hyundai Motor Company Introduces A Health + Mobility Concept for Wellness In Mobility", Fountain Valley, Californa (2017).

Last Push Before The Kickstarter Campaign Ends on Monday 4pm CET (Mar. 28, 2014).

Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).

Staab, Wayne J., et al., "A One-Size Disposable Hearing Aid is Introduced", The Hearing Journal 53(4):36-41) Apr. 2000.

Stretchgoal—It's Your Dash (Feb. 14, 2014).

Stretchgoal—The Carrying Case for The Dash (Feb. 12, 2014).

Stretchgoal—Windows Phone Support (Feb. 17, 2014).

The Dash + The Charging Case & The BRAGI News (Feb. 21, 2014).

The Dash—A Word From Our Software, Mechanical and Acoustics Team + An Update (Mar. 11, 2014).

Update From BRAGI—$3,000,000—Yipee (Mar. 22, 2014).

Wikipedia, "Gamebook", https://en.wikipedia.org/wiki/Gamebook, Sep. 3, 2017, 5 pages.

Wikipedia, "Kinect", "https://en.wikipedia.org/wiki/Kinect", 18 pages, (Sep. 9, 2017).

Wikipedia, "Wii Balance Board", "https://en.wikipedia.org/wiki/Wii_Balance_Board", 3 pages, (Jul. 20, 2017).

BRAGI Update—Certifications, Production, Ramping Up (Nov. 13, 2015).

BRAGI Update—On Track, On Track and Gems Overview (Jun. 24, 2015).

\* cited by examiner

VARIABLE COMPUTING ENGINE FOR INTERACTIVE MEDIA BASED UPON USER BIOMETRICS

PRIORITY STATEMENT

This application claims priority to U.S. Provisional Patent Application 62/359,006, filed on Jul. 6, 2016, entitled VARIABLE COMPUTING ENGINE FOR INTERACTIVE MEDIA BASED UPON USER BIOMETRICS, hereby incorporated by reference in its entirety.

FIELD OF THE INVENTION

The present invention relates to wearable devices. More particularly, but not exclusively, the present invention relates to using wearable devices such as wireless earpieces for interacting with gaming systems or interactive storybooks.

BACKGROUND

Audiobooks have generally waned in popularity in the English speaking world. The variable branch books popularized by Bantam Books have fallen out of favor in comparison to other story modalities. To a large degree, the computer industry has usurped such interactions via Internet gaming, alone or with others. Consequently, this art form has waned in popularity. What is needed is a new way for the user to interact with the story line, and in fact influence the progression of the story line or even its ending.

SUMMARY OF THE DISCLOSURE

Therefore, it is a primary object, feature, or advantage of the present invention to improve over the state of the art.

It is a further object, feature, or advantage to provide a system which may detect user biometric parameters for inclusion in the branching patterns of the game.

It is a still further object, feature, or advantage to modify the branching pattern of the game based upon user biometric inputs.

Another object, feature, or advantage is to attenuate the intensity of a story to provide a protective function if the user was to exceed a particular level of stress.

Yet another object, feature, or advantage is to elevate the action or associated stress level of the story based upon biometric data fed to the engine relative to the desired level of interaction in the story or branch.

A further object, feature, or advantage is to protect the user by intentionally calming them via a modification of the branch if the biometric sensors detect a problematic level of interaction.

One or more of these and/or other objects, features, or advantages will become apparent from the description that follows. No single embodiment to need include each or very one of these objects, features, or advantages. Different embodiments may have different objects, features, or advantages.

According to one aspect, a system and method for implementing interactive media content is provided. Interactive media content is received for communication to a user through at least wireless earpieces. User biometrics are measured utilizing the wireless earpieces. A user condition associated with the user biometrics is determined. Branching patterns of the interactive media content are modified in response to the user condition. Another embodiment provides wireless earpieces including a processor for executing a set of instructions and a memory for storing the set of instructions. The instructions are executed to perform the method described above.

According to another aspect, a virtual reality system is provided. The virtual reality system includes a virtual reality headset for displaying a virtual reality environment to a user. The virtual reality system also includes wireless earpieces that receive interactive media content from the virtual reality headset for communication to a user through at least wireless earpieces, measure user biometrics utilizing biometric sensors of the wireless earpieces, determine a user condition associated with the user biometrics, and modify branching patterns of the interactive media content in some response to the user condition.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
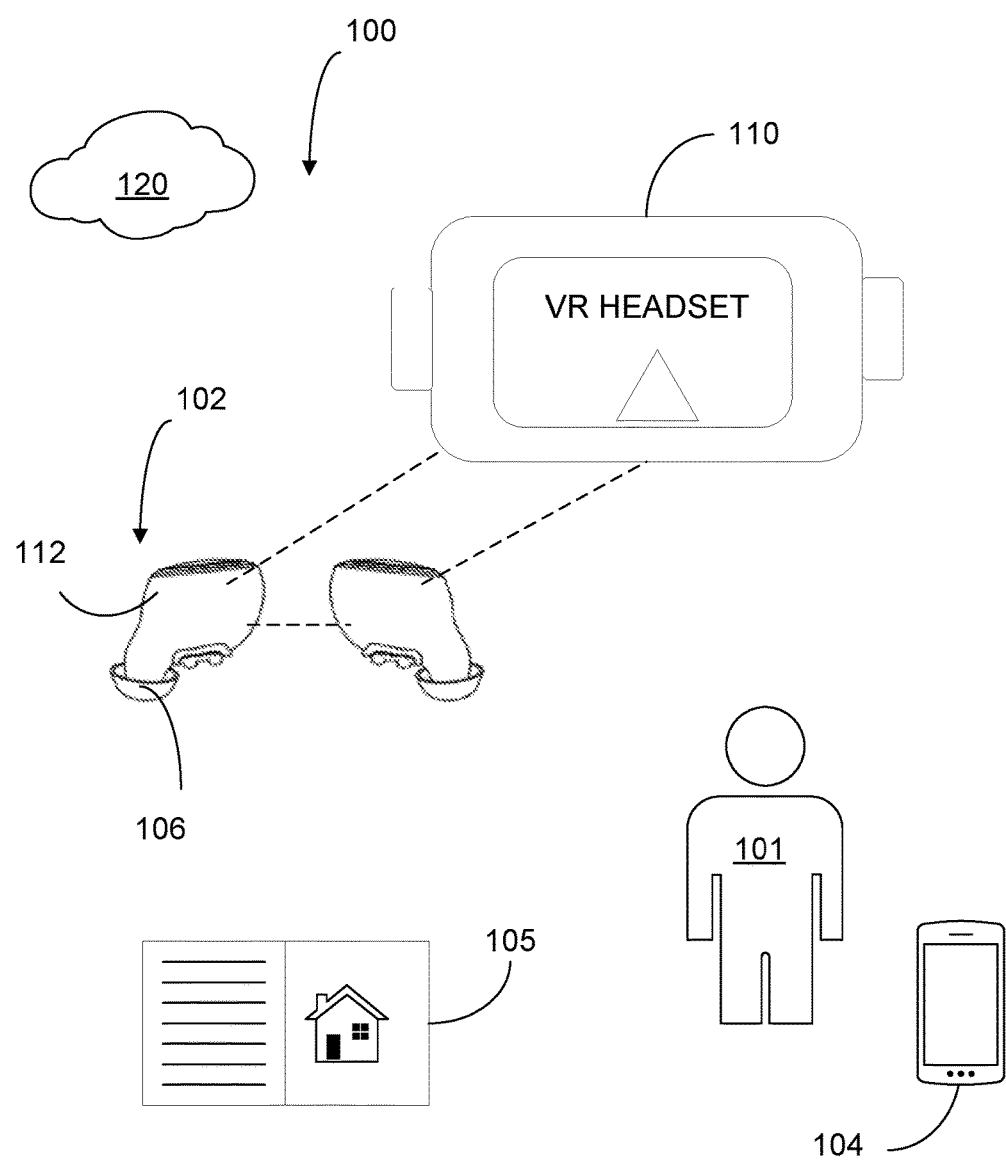
FIG. 1 is a pictorial representation of a communication environment in accordance with an illustrative embodiment.

The illustrative embodiments provide a system, method, and wireless earpieces for interacting with a gaming system or interactive storybook utilizing biometrics read by the wireless earpieces. The applicable story, game, multiplayer interface, or other media content may be referred to as a "game" for purposes of simplicity. The wireless earpieces may sense the biometrics of the user. The biometrics may include pulse, blood pressure, temperature, location, orientation, position, determine stress level, or other measured or determined parameters, factors, characteristics, or so forth. The user may also actively interact with the game utilizing voice, audio, tactile, gestures, motions, or other feedback detected by the wireless earpieces.

The game may be configured to utilize a user profile to control how user biometrics and interactions may control the game. In one embodiment, various game variables, branches, decisions, or other attributes may be implemented based on the user biometrics. For example, variables, such as branching patterns including potential story lines may be alternated based on the user biometrics. The branch may be utilized to satisfy, scare, upset, calm, or otherwise affect the user based on the determined biometrics to achieve a selected or desired level of interaction. For example, user preferences for a child may be set so that the storyline is meant to intentionally calm the child as the story progresses. As a result, the game may be tailored for the user. The game may be tailored to satisfy the user, traumatize the user, or keep the user guessing. The game may include media content including audio, visual, tactile, olfactory, and other input, stimuli, or feedback.

In one embodiment, the game may include a digital content device (e.g., e-book, laptop, tablet, cell phone, etc.) that may communicate the media content to the user. The interactive book may communicate with the wireless earpieces to communicate content and receive user input and biometrics. In another embodiment, the game may include a virtual reality system including a virtual reality headset. The interactive book or virtual reality headset may communicate with the wireless earpieces wirelessly or utilizing a wired connection. For example, the virtual reality headset may be coupled to the wireless earpieces utilizing magnetic connectors. Wires extending from the virtual reality headset may magnetically couple and utilize induction communications and power transfer to power the wireless earpieces. In other examples, the interactive book or virtual reality headset may include a frame configured to connect to the wireless earpieces. In another embodiment, a wireless protocol, standard, connection, or link, such as Bluetooth, NFMI, or Wi-Fi may be utilized.

The wireless earpieces are worn in the ear of the user. For example, the wireless earpieces are configured to fit at least partially into an external auditory canal of the user. The ear canal is a rich space for obtaining biometric measurements about the user as well as stabilizing the wireless earpieces as they are worn. The wireless earpieces may be utilized during a number of rigorous physical activities that require stability. The shape and configuration of the wireless earpieces allow the wireless earpieces to be worn for long periods of time while gathering valuable information utilizing the sensors of the wireless earpieces. The sensors of the wireless earpieces may include accelerometers, gyroscopes, microphones, camera or imaging devices, contact/conductivity sensors, pulse oximeters, and so forth. Important measurements taken by the sensors may include pule rate, blood oxygenation, microphone, position/orientation, location, temperature, altitude, cadence, calorie expenditure, and so forth.

The wireless earpieces may include any number of sensor arrays configured to capture information about the user. The large amount of data may identify the user to dynamically adjust the configuration of the wireless earpieces. The wireless earpieces may learn over time in response to user input and historical information. Alerts may be played to the user indicating the status of the configuration adjustment process (e.g., initiated, in process, pending, awaiting verification, change made, rejected, etc.).

The illustrative embodiments may be utilized for entertainment, scientific, educational, or commercial applications. Virtual reality headsets, such as those produced by Google, HTC, Samsung, oculus, Sony, Microsoft, and so forth, may present any number of two-dimensional or three-dimensional visualizations to the user. The illustrative embodiments minimize the existing mass problems with bulky over here headphone or audio systems. As a result, the characteristics of angular momentum associated with the user's head are not increased significantly decreasing the effects of torque and neck and head strain that may be associated with such virtual reality systems.

The wireless earpieces may include any number of sensors that may communicate with the sensors, systems and components of the interactive story or virtual reality headset to further enhance the user's experience. In one embodiment, the sensors of the wireless earpieces may include accelerometers, gyroscopes, magnetometers, optical sensors, pulse oximeters, GPS chips, thermometers, and so forth. The data acquired by the sensors may be utilized to measure or otherwise determine the user's condition, characteristics, position, location, stress levels, mental state, or so forth. As a result, the data may be utilized to enhance the users experience within the game or virtual reality environment. In addition, the sensor provide data that enhances sensor measurements of the virtual reality headset.

The precise determination of the user's location and position may also be utilized to provide more accurate three-dimensional spatial sound imaging for the user. In addition, the sensors may be utilized to sense any number of biometric readings or information, such as heart rate, respiratory rate, blood, or skin physiology, or other biometric data. This information may be utilized to determine whether the user is safe in the virtual reality environment, enjoying a game, or if the user is stressed or fatigued. In addition, game interaction may be adjusted based on the condition of the user. For example, various branches, sub-branches, or endings may be utilized. Besides being integrated with or connected to the interactive story or virtual reality headset, the wireless earpieces may be utilized to make and receive communications (e.g., telephone calls, transcribed text messages, audio/tactile alerts, etc.), play music, filter or block sound, amplify sounds, or so forth.

The wireless earpieces may be utilized for daily activities, such as exercising, phone calls, travel, and so forth. The wireless earpieces may then also serve a dual-purpose by integrating as an audio interface of an interactive book or virtual reality system. As a result, more expensive audio components are not required reducing the cost, weight, and complexity of the system. The user may be relieved of significant weight and strain by utilizing the reduced footprint of the wireless earpieces. In addition, the various types of games may include a stand-alone power source or battery that may be utilized to power the wireless earpieces on the fly.

FIG. 1 is a pictorial representation of a communication environment 100 in accordance with an illustrative embodiment. The wireless earpieces 102 may be configured to communicate with each other and with one or more wireless devices 104.

The wireless earpieces 102 may be worn by a user 101 and are shown as worn and separately from their positioning within the ears of the user 106 for purposes of visualization. A block diagram of the wireless earpieces 102 if further shown in FIG. 2 to further illustrate components and operation of the wireless earpieces 102. A first wireless earpiece and a second wireless earpiece are shown which together may form a set of wireless earpieces 102, although only one wireless earpiece need be used.

In some applications, temporary adhesives or securing mechanisms (e.g., clamps, straps, lanyards, extenders, chargers, etc.) may be utilized to ensure that the wireless earpieces 102 remain in the ears of the user 101 even during the most rigorous and physical activities. For example, the wireless earpieces 102 may be utilized during marathons, swimming, virtual reality simulations, interactive gaming, team sports, biking, hiking, parachuting, or so forth. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless earpieces 102 may include logic for dynamically configuring components of the wireless earpieces 102, such as speakers and microphones, to the conditions of the communication environment 100.

The wireless earpieces 102 may determine their position with respect to each other as well as the VR headset 110 and/or other wireless device 104 and an interactive book 105. For example, position information for the wireless earpieces 102 may determine proximity of the devices in the communication environment 100. For example, global positioning information, wireless triangulation, or signal strength/activity may be utilized to determine proximity and distance of the devices to each other in the communication environment 100. In one embodiment, the distance information may be utilized to determine whether the wireless earpieces 102 are both being worn (e.g., should be experiencing similar environmental conditions, noise, etc.). In one embodiment, multiple wireless earpiece sets may simultaneously communicate within the communication environment. For example, multiple wireless earpieces may communicate with the VR headset 110, interactive book 105 simultaneously.

In one embodiment, the wireless earpieces 102 and sensors associated therewith (whether internal or external) may be configured to take a number of measurements or log information during normal usage. The sensor measurements may be utilized to extrapolate other measurements, factors, or conditions applicable to the user 101. For example, the sensors may monitor the user's heartbeat or EKG to determine the user's unique pattern or characteristics. The user 101 or another party may configure the wireless earpieces 102 or the interactive book 105 directly or through a connected device and app (e.g., mobile app with a graphical user interface) to store or share information, audio, images, and other data. Some examples of standard usage may include detecting and recording a heartbeat, setting user input and biometrics for implementing variable or branching decisions for a game, setting noise thresholds and the associated speaker volume level or microphone sensitivity, setting a gesture/input for performing an action (e.g., playing music, opening an application, providing an audio indication of biometric feedback, etc.), active participation in a conversation, listening to music, or so forth.

The wireless earpieces 102 may also determine the status, condition, or other user information utilizing the biometric data from the sensors and other user input. The user information may relate to the emotional or physical state of the user as determined by the sensors. The wireless earpieces 102 may store information within the memory for determining the user information. For example, default values, information, thresholds, or data may be utilized to determine the user information as well as associate the user information with any number of applicable categories (e.g., excited, stressed, scared, happy, content, etc.).

The wireless earpieces 102 may configure or reconfigure themselves during an initial set up process, during start up, during regular use, or in response to a user request. In one embodiment, each of the sensors of the wireless earpieces 102 may perform baseline readings to determine readings when the communications environment 100 is quiet, slightly noise, and loud as well as readings associated with the physical and emotional state of the user 101 (e.g., excited, nervous, scared, happy, calm, stressed, etc.). For example, the communications environment 100 may include the user's home, a library, roadway, work out areas, office, school, business, mechanical shop, sports venue, and so forth without limitation. In one embodiment, the wireless earpieces 102 may determine a default configuration for the speakers and microphones based on a determined location. The speakers and microphones may then be further self-adjusted based on the real-time noise levels in the determined location to adjust to the optimal configuration for the wireless earpieces 102

The wireless earpieces 102 may include any number of sensors 112 and logic for measuring and determining user biometrics, such as pulse rate, skin conduction, blood oxygenation, temperature, calories expended, voice and audio output, position, and orientation (e.g., body, head, etc.). The sensors 112 may also determine the user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces. The user input may be measured by the wireless earpieces 102 and converted into internal commands or external commands that may be sent to one or more external devices such as mobile devices, computers, or other wearable devices. For example, the user 101 may create a specific head motion and voice command that when detected by the wireless earpieces 102 are utilized to automatically adjust to noise levels in the communications environment 100 or increase or decrease the volume.

The sensors 112 may make all of the measurements with regard to the user 101 or may communicate with any number of other sensory devices (e.g., interactive book 105, etc.) in the communication environment 100 to measure information and data about the user 101 as well as the communication environment 100 itself. In one embodiment, the communication environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 101.

In other embodiments, the communication environment 100 may include any number of devices, components, or so forth that may communicate with each other directly or indirectly through a wireless (or wired) connection, signal, or link. The communication environment 100 may include one or more networks and network components and devices such as routers, servers, signal extenders, intelligent network devices, computing devices, or so forth.

Communications within the communication environment 100 may occur through a network 120 or may occur directly between devices, such as the wireless earpieces 102 and the interactive book 105, or indirectly through a network, such as a Wi-Fi network. The network 120 may communicate with or include a wireless network, such as a Wi-Fi, cellular (e.g., 3G, 4G, 5G, PCS, GSM, etc.), Bluetooth, or other short range or long range radio frequency network. The network may also include or communicate with any number of hard wired networks, such as local area networks, coaxial networks, fiber-optic networks, network adapters, or so forth. Communications within the communication environment 100 may be operated by one or more users, service providers (e.g., secure, public, private, etc.), or network providers.

The wireless earpieces 102 may play, communicate, or utilize any number of alerts or communications to indicate that the status of interactive gaming being performed in the communications environment 100. For example, one or more alerts may indicate when branch adjustments are being made based on the state of the user. The alert may be communicated to the user 101 or to another individual or device with permissions or administrative rights (e.g., parent, caretaker, etc.). The alert may be presented utilizing specific tones, verbal acknowledgements, tactile feedback, or other forms of communicated messages. For example, an alert may be played during each stage of a game. The corresponding alert may also be communicated to the interactive book 105.

In other embodiments, the wireless earpieces 102 may also vibrate, flash, play a tone or other sound, or give other indications of the automatic self-configuration process of the game in order to prompt user actions (e.g., providing a manual adjustment, provide additional feedback, etc.) or to implement any number of associated steps. The wireless earpieces 102 may also communicate an alert to other devices that shows up as a notification, message, or other indicator indicating the necessity for configuration/re-configuration or a changed status of the configuration process, such as an audio alert that "the story has been changed to calm your child."

The wireless earpieces 102 may include logic for automatically implementing gaming configuration in response to wireless earpiece set-up, start-up, connection to a gaming system (e.g., interactive book 105, virtual reality headset 110, etc.) condition changes (e.g., location, activities, etc.), event happenings, user requests or various other conditions and factors of the communication environment 100. For example, the wireless device 104 may communicate instructions received from the wireless earpieces 102 for the user 106 to provide feedback if the user does not agree with the selected gaming variables.

The wireless device 104 may include an application that displays instructions and information to the user 106 in response to configuration of the game being needed or required.

In one embodiment, the wireless device 104 may utilize short-range or long-range wireless communications to communicate with the wireless earpieces 102 through a wireless signal or devices of the communication environment 100. For example, the wireless device 104 may include a Bluetooth and cellular transceiver within the embedded logical components. For example, the wireless signal may be a Bluetooth, Wi-Fi, Zigbee, Ant+, near-field magnetic induction (NFMI), or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, NFMI, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sensor data sent from the wireless earpieces 102. For example, the wireless device 104 may represent any number of android, iOS, Windows, open platforms, or other systems and devices. Similarly, the wireless device 104 or the wireless earpieces 102 may execute any number of applications that utilize the user input, proximity data, biometric data, and other feedback from the wireless earpieces 102 to initiate, authorize, or perform configuration and the associated tasks.

As noted, the layout of the internal components of the wireless earpieces 102 and the limited space available for a product of limited size may affect where the sensors 112 and other components may be positioned. The positions of the sensors 112 within each of the wireless earpieces 102 may vary based on the model, version, and iteration of the wireless earpiece design and manufacturing process.

The interactive book 105 may represent any number of electronic devices. In one embodiment, the interactive book 105 may represent a book including sensor, transceiver, user interface (e.g. touchscreen, buttons, scroll wheels, virtual buttons, etc.), and processing components. The interactive book 105 may also represent any number of e-books, tablets, personal computing devices, electronic readers, cell phones, personal digital assistants, plug-and-play electronics, or other handheld wireless devices. The interactive book 105 may execute or implement any number of processes, steps, or methods that are associated with digital logic, firmware, software (e.g., applications, operating systems, kernels, sets of instructions, etc.), or combination thereof.

The interactive book 105 may communicate directly with the wireless earpieces 102, the wireless device 104, and/or the network 120 individually, simultaneously, or concurrently. In one embodiment, the interactive book 105 may receive user input and biometric readings directly from the wireless earpieces 102 during communication of media content, such as an interactive story, game, communication, or so forth. The wireless earpieces 102 or the interactive book 105 may individually or jointly perform the processes herein described for utilizing user input and biometric information. For example, a branching pattern or algorithm may be utilized by the wireless earpieces 102 to determine variables and decisions that are implemented by the communications environment 100 including the interactive book 105. The wireless earpieces 102 and the interactive book 105 may communicate relevant information.

In another example, the user input and biometrics may be communicated from the wireless earpieces 102 as measured for utilization by the interactive book 105. For example, the wireless earpieces 102 may determine a physical and emotional state of the user 106 based on the biometric readings. The applicable information may then be communicated to the interactive book 105. The interactive book 105 may make any number of branching decisions or implement variables in response to the user input, biometrics, and determined user state. For example, the game or story may be varied to meet a desired level of interactivity or user state. In one embodiment, the interactive book 105 may be utilized for treating individuals with disabilities. As a result, the interactive book 105 and the wireless earpieces 102 may communicate to ensure that the user 106 is not stressed or otherwise unhappy. For example, a less stressful storyline may be substituted in response to determining the user is distressed based on biometrics, vocalizations, body position and orientation, head movements, or other user detectable information read by the wireless earpieces 102. As a result, the storyline or intensity of the game presented or otherwise communicated by the interactive book 105 and the wireless earpieces 102 is attenuated to similarly affect the user 106.

Figure 2:
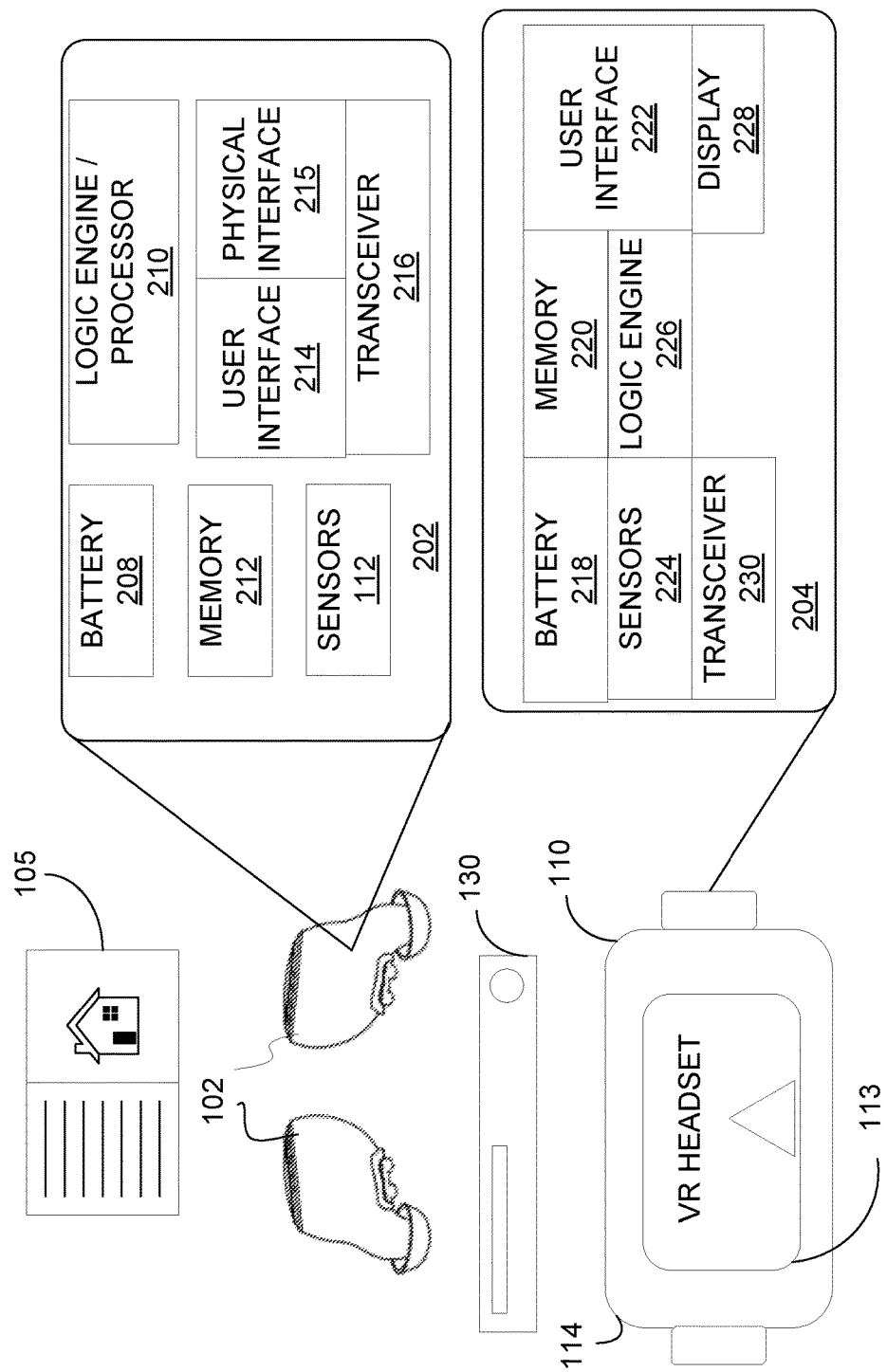
FIG. 2 is a pictorial representation of a virtual reality system in accordance with an illustrative embodiment.

FIG. 2 is a pictorial representation of a virtual reality system in accordance with an illustrative embodiment. The virtual reality system may include any number of devices, components, and systems. In one embodiment, the virtual reality system may include wireless earpieces 102 which may include a left earpiece and a right earpiece and a Virtual Reality headset 110 with a strap 114. A processing system 130 may also be included. The processing system 130 may communicate with the virtual reality headset 110 and/or the wireless earpieces 102.

In one embodiment, the processing system 130 may process media content that is communicated through the VR headset 110 and the wireless earpieces 102. The processing system 130 may also process biometric readings from the user to adjust, amend, change, or otherwise modify decisions, branches, or other content associated with a game presented by the virtual reality system. In other embodiments, the wireless earpieces 102 may process all of the biometric readings from the user to adjust the game or other media content presented to the user by one or more parts of the virtual reality system. The processing system 130 may represent a gaming system (e.g., Xbox, Playstation, Nintendo System, etc.), personal computer, server, cloud interface device, or other similar devices. The processing system 130 may receive any number of disks, cartridges, storages, or may access content through one or more networks or connections.

The wireless earpieces 102 are configured to play audio associated with virtual content presented by the virtual reality headset 110. The wireless earpieces 102 may be configured to play music or audio, receive and make phone calls or other communications, determine ambient environmental readings (e.g., temperature, altitude, location, speed, heading, etc.), read user biometrics and actions (e.g., heart rate, motion, sleep, blood oxygenation, calories burned, etc.). The user biometrics and other readings may be utilized to make determinations or decisions associated with the media content presented by the virtual reality system.

The virtual reality headset 110 replicates or displays an environment simulating physical presence in places in the real world or imagined worlds and lets the user interact in that environment. Virtual reality may also be referred to as immersive multimedia and may be utilized to create sensory experiences which may include sight, hearing, touch, smell, and taste. The virtual reality headset 110 may be powered by a power plug, battery, or other connection (e.g., USB connection to a computing or gaming device). The virtual reality headset 110 may also communicate (send and receive) data utilizing a wired or wireless connection to any number of computing, communications, or entertainment devices.

The visor 113 may be utilized to display visual and graphical information to the user. The visor 113 may include one or more displays (e.g., liquid crystal displays, light emitting diode (LED) displays, organic LED, etc.) or projectors (direct, indirect, or refractive) for displaying information to the eyes of the user. Although not shown, the virtual reality headset 110 may also include touch screens, smell interfaces, or tasting interfaces for enhancing the experience of the user. The size and shape of the virtual reality headset 110, visor 113, and the strap 114 may vary by make, model, manufacturer as well as user configuration of the virtual reality headset 110, such as those produced by Google, HTC, Sony, Oculus, Epson, Samsung, LG, Microsoft, Durovis, Valve, Avegant, and others. In other embodiments, the visor 113 may be transparent, glass, or see-through allowing the user to interact with the real world during utilization of the virtual reality system. For example, the virtual reality system may be utilized to present augmented reality content or media to the user.

The strap 114 extends between sides of the visor 113 and is configured to secure the virtual reality headset 110 to the head of the user. The strap 114 may be formed of any number of materials, such as cotton, polyester, nylon, rubber, plastic, or so forth. The strap 114 may include buckles, loops, or other adjustment mechanisms for fitting the virtual reality headset 110 to the head of the user. Some virtual reality headsets are much more helmet-like or include various structural components (e.g., straps, arms, extensions, etc.) for securing the virtual reality headset 110 to the head of the user during both regular and vigorous usage.

With respect to the wireless earpieces 102, sensor measurements may refer to measurements made by one or both of the wireless earpieces 204. For example, the wireless earpieces 102 may determine that the sensor signal for the pulse oximeter of the right wireless earpiece is very noisy and as a result, may utilize the sensor signal from the pulse oximeter of the left wireless earpiece as the primary measurement. The wireless earpieces 102 may also switch back and forth between pulse oximeters of the left and right side in response to varying noise for both of the wireless earpieces. As a result, clearest sensor signal may be utilized at any given time. In one embodiment, the wireless earpieces 102 may switch sensor measurements in response to the sensor measurements exceeding or dropping below a specified threshold.

The user may also be wearing or carrying any number of sensor-enabled devices, such as heart rate monitors, pacemakers, smart glasses, smart watches or bracelets (e.g., Apple watch, Fitbit, etc.), or other sensory devices that may be worn, attached to, or integrated with the user. The data and information from the external sensor devices may be communicated to the wireless earpieces 102. In another embodiment, the data and information from the external sensor devices may be utilized to perform additional processing of the information sent from the wireless earpieces 102 to a wireless device. As previously noted, the media content may be adjusted based on the readings of the user to better satisfy the user or third parties monitoring the user.

The sensors of the wireless earpieces 120 may also be positioned at enantiomeric locations. For example, a number of colored light emitting diodes may be positioned to provide variable data and information, such as heart rate, respiratory rate, and so forth. The data gathered by the LED arrays may be sampled and used alone or in aggregate with other sensors. As a result, sensor readings may be enhanced and strengthened with additional data.

As shown, the wireless earpieces 102 may be physically or wirelessly linked to the virtual reality headset 110. User input and commands may be received from either the wireless earpieces 102 or the virtual reality headset 110 for implementation on any of the devices of the virtual reality system (or other externally connected devices, such as a processing system 130). As previously noted, the wireless earpieces 102 may be referred to or described herein as a pair (wireless earpieces) or singularly (wireless earpiece). The description may also refer to components and functionality of each of the wireless earpieces 102 collectively or individually.

In one embodiment, the wireless earpieces 102 play the audio corresponding to the virtual reality content displayed by the virtual reality headset 110. In addition, the wireless earpieces 102 may provide additional biometric and user data that may be further utilized by the virtual reality headset 110 or connected computing, entertainment, or communications devices, systems, equipment, or components.

In some embodiments, the virtual reality headset 110 may act as a logging tool for receiving information, data, or measurements made by the wireless earpieces 102. For example, the virtual reality headset 110 may be worn by the user to download data from the wireless earpieces 102 in real-time. As a result, the virtual reality headset 110 may be utilized to store, display, and synchronize data to/from the wireless earpieces 102. For example, the virtual reality headset 110 may display pulse, blood oxygenation, distance, calories burned, and so forth as measured by the wireless earpieces 102. The wireless earpieces 102 and the virtual reality headset 110 may have any number of electrical configurations, shapes, and colors and may include various circuitry, connections, and other components.

In one embodiment, the wireless earpieces 102 may include a battery 208, a logic engine including a processor 210, a memory 212, user interface 214, physical interface 215, a transceiver 216, and sensors 112. The virtual reality headset 110 may have a battery 218, a memory 220, an interface 222, and sensor or sensors 224. The battery 208 is a power storage device configured to power the wireless earpieces 302. Likewise, the battery 218 is a power storage device configured to power the virtual reality headset 110. In other embodiments, the batteries 208 and 218 may represent a fuel cell, thermal electric generator, piezo electric charger, solar charger, ultra-capacitor, hybrid storage device, or other existing or developing power storage technologies.

The logic engine 210 is the logic that controls the operation and functionality of the wireless earpieces 102. The logic engine 210 may include a processor, circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize information from the sensors 112 to determine the biometric information, data, and readings of the user. The logic engine 210 may utilize this information and other criteria to inform the user of the biometrics (e.g., audibly, through an application of a connected device, tactilely, etc.).

The logic engine 210 may also process user input to determine commands implemented by the wireless earpieces 102 or sent to the wireless earpieces 102 through the transceiver 216. The user input may be determined by the sensors 112 to determine specific actions to be taken. In one embodiment, the logic engine 210 may implement a macro allowing the user to associate user input as sensed by the sensors 112 with commands. As described herein, the logic engine 210 may perform any number of branching decisions based on available decisions within a game, story, or other interactive media. The logic engine 210 may also utilize artificial intelligence to create new branches, threads, or scenarios appropriate for the user. For example, the logic engine 210 may utilize biometric information from the sensors 112 and a user profile to determine whether the physical, emotional, and other aspects of the user response are as desired. The logic engine 210 may implement any number of training or gaming scenarios to reach a desired user response(s).

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, including executing software, instructions, programs, and applications, converting and processing signals and information, and performing other related tasks.

The memory 212 is a hardware element, device, or recording media configured to store data for subsequent retrieval or access at a later time. The memory 212 may be static or dynamic memory. In one embodiment, the memory 212 and the logic engine 210 may be integrated. The memory may use any type of volatile or non-volatile storage techniques and mediums. The memory 212 may store information related to the status of a user, wireless earpieces 102, virtual reality headset 110, and other peripherals, such as a wireless device, smart case for the wireless earpieces 102, smart watch, and so forth. In one embodiment, the memory 212 may display instructions or programs for controlling the user interface 214 including one or more LEDs or other light emitting components, speakers, tactile generators (e.g., vibrator), and so forth. The memory 212 may also store the user input information associated with each command.

The memory 212 may further store the game, story, or interactive media implemented by the virtual reality system. The memory 212 may also store the user profile including measurements to reach a desired user state (e.g., pulse, voice characteristics, blood chemistry, etc.). For example, the wireless earpieces 102 may include sensors 112 that measure adrenaline including measuring indirectly. The interactive media content may be selected such that hormones or other chemicals, such as adrenaline are within a targeted range or do not exceed one or more thresholds.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.) or other suitable radio frequency standards, networks, protocols, or communications. The transceiver 216 may also be a hybrid transceiver that supports a number of different communications. For example, the transceiver 216 may communicate with the virtual reality headset 110 or other systems utilizing wired interfaces (e.g., wires, traces, etc.), NFC or Bluetooth communications.

The components of the wireless earpieces 102 may be electrically connected utilizing any number of wires, contact points, leads, busses, wireless interfaces, or so forth. In addition, the wireless earpieces 102 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 102 for connecting and communicating with the virtual reality headset 110 or other electrical components.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of the virtual reality headset 110. In another embodiment, the physical interface 215 may include a wireless inductor for charging the wireless earpieces 102 without a physical connection to a charging device.

The user interface 214 is a hardware interface for receiving commands, instructions, or input through the touch (haptics) of the user, voice commands, or predefined motions. The user interface 214 may be utilized to control the other functions of the wireless earpieces 102. The user interface 214 may include the LED array, one or more touch sensitive buttons or portions, a miniature screen or display, optical sensors, or other input/output components. The user interface 214 may be controlled by the user or based on commands received from the virtual reality headset 110 or a linked wireless device.

In one embodiment, the user may provide feedback by tapping the user interface 214 once, twice, three times, or any number of times. Similarly, a swiping motion may be utilized across or in front of the user interface 214 (e.g., the exterior surface of the wireless earpieces 102) to implement a predefined action. Swiping motions in any number of directions may be associated with specific activities, such as play music, pause, fast forward, rewind, activate a digital assistant (e.g., Siri, Cortana, smart assistant, etc.). The swiping motions may also be utilized to control actions and functionality of the virtual reality headset 110 or other external devices (e.g., smart television, camera array, smart watch, etc.). The user may also provide user input by moving her head in a particular direction or motion or based on the user's position or location. For example, the user may utilize voice commands, head or hand gestures, or touch commands to change the content displayed by the virtual reality headset 110.

The sensors 112 may include pulse oximeters, accelerometers, gyroscopes, magnetometers, inertial sensors, photo detectors, miniature cameras, chemical sensors (e.g., blood, sweat, excretions, odors, etc.), and other similar instruments for detecting location, orientation, motion, and so forth. The sensors 112 may also be utilized to gather optical images, data, and measurements and determine an acoustic noise level, electronic noise in the environment, ambient conditions, and so forth. The sensors 112 may provide measurements or data that may be utilized to filter or select images for display by the virtual reality headset 110 or the overall media content communicated by the virtual reality system. For example, motion or sound detected on the left side of the user may be utilized to command the smart glasses to display camera images from the left side of the user. Motion or sound may be utilized, however, any number of triggers may be utilized to send commands to the virtual reality headset 110. The sensors 112 may detect the physical and emotional condition and response of the user to the media content. The measurements from the sensors 112 may be correlated with any number of stress levels or physical or emotional states. For example, the logic engine 210 may process the measurements against baseline readings for various user conditions and state to determine the condition and state of the user.

The virtual reality headset 110 may include components similar in structure and functionality to those shown for the wireless earpieces 102 including a battery 218, a memory 220, a user interface 222, sensors 224, a logic engine 226, a display 228, and transceiver 230. The virtual reality headset 110 may include the logic engine 226 for executing and implementing the processes and functions as are herein described. The battery 218 of the virtual reality headset 110 may be integrated into the frames of the virtual reality headset 110 and may have extra capacity which may be utilized to charge the wireless earpieces 102. The virtual reality headset 110 may include a power adapter, interface, amplifiers, or other power control components. In addition, all or a portion of the logic engine 226, sensors 224, user interface 222, display 228, and transceiver 230 may be integrated in the frame and/or lenses of the virtual reality headset 110.

The user interface 222 of the virtual reality headset 110 may include a touch interface or display for indicating the status of the virtual reality headset 110. For example, an external LED light may indicate the battery status of the virtual reality headset 110 as well as the connected wireless earpieces 102, connection status (e.g., linked to the wireless earpieces 102, wireless device, etc.), download/synchronization status (e.g., synchronizing, complete, last synchronization, etc.), or other similar information. The user interface 222 may also include optical sensors that track the motion of the user's eyes and facial gestures to perform motion or various actions based on the sensed input.

The display 228 may be integrated into the lenses of the virtual reality headset 110 or represent one or more projectors that may project content directly or reflectively to the eyes of the user. For example, the display 228 may represent a transparent organic light emitting diode lens that is see through and may be utilized to display content. Projectors of the display 228 may utilize any number of wavelengths or light sources to display data, images, or other content to the user. In another embodiment, the display 228 may be transparent or semi-transparent allowing the virtual reality system to function as an augmented reality system. For example, the virtual reality system may be utilized in any number of real-world environments. As noted, the content displayed by the display 228 may be changed or reconfigured based on the sensed response of the user (e.g., to achieve desired physical and emotional states, conditions, or measurements).

An LED array of the user interface 222 may also be utilized for display actions. For example, an LED may be activated in response to someone or something being in the user's blind spot while riding a bicycle. In another embodiment, device status indications may emanate from the LED array of the wireless earpieces 102 themselves, triggered for display by the user interface 222 of the virtual reality headset 110. The battery 218 may be charged through a physical interface of the user interface 222. The physical interface may be integrated with the user interface 222 or may be a separate interface. For example, the user interface 222 may also include a hardware interface (e.g., port, connector, etc.) for connecting the virtual reality headset 304 to a power supply or other electronic device. The user interface 222 may be utilized for charging as well as communications with externally connected devices. For example, the user interface 222 may represent a mini-USB, micro-USB or other similar miniature standard connector. In another embodiment, a wireless inductive charging system may be utilized to initially replenish power to the wireless earpieces 102. The virtual reality headset 110 may also be charged utilizing inductive charging.

In another embodiment, the virtual reality headset 110 may also include sensors 224 for detecting the location, orientation, movement, and biometrics of the user as well as proximity to the wireless earpieces 102. For example, the sensors 224 of the virtual reality headset 110 may include optical sensors or cameras for capturing images and other content about the user (e.g., eye movement, body movement, expressions, arm and leg positioning, etc.) and around the periphery of the user (e.g., front, sides, behind, etc.). The virtual reality headset 110 may detect any number of wavelengths and spectra to provide distinct images, enhancement, data, and content to the user. The virtual reality headset 110 may also include an LED array, galvanic linkage or other touch sensors, battery, solar charger, actuators or vibrators, one or more touch screens or displays, an NFC chip, or other components.

As originally packaged, the wireless earpieces 102 and the virtual reality headset 110 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth.

In one embodiment, the virtual reality system may also include an interactive book 105. The interactive book 105 may include any of the components of the wireless earpieces 102 or the virtual reality headset 110. For example, the interactive book 105 may include a battery, memory, logic engine/processor, user and physical interfaces, sensors, and transceivers. In one embodiment, the interactive book 105 may include one or more pages that may be navigated by a user. The pages may be touch screens or include interactive components for interacting with a finger of a user, a stylus, or other selection component or appendage. Content displayed by the pages may vary based on a story or game implemented by the interactive book 105. The interactive book 105 may also include one or more speakers, vibrators, dynamic braille interfaces, or other communications components for bi-directional communication with the user.

As described, the interactive book 105 may vary the communicated content in response to the measurements from the sensors 112 and determined user status as processed by the logic engine 210. The interactive media content may be stored by the interactive book 105, the wireless earpieces 102, or the virtual reality headset 110 or by another device of the virtual reality system. The interactive book 105 may communicate with all or portions of the virtual reality system utilizing a wired or wireless connection. For example, the interactive book 105 may communicate with the wireless earpieces 102 utilizing a Bluetooth connection. In one embodiment, audio associated with the interactive media content displayed by the interactive book 105 may be communicated to the user by the wireless earpieces 102.

All or portions of the virtual reality system may function independently, simultaneously as a networked group, or utilizing direct communications. For example, the wireless earpieces 102, the virtual reality headset 110, or the interactive book 105 may be used alone or in combination by a user to achieve the methods, purposes, functionality, and features herein described.

Figure 3:
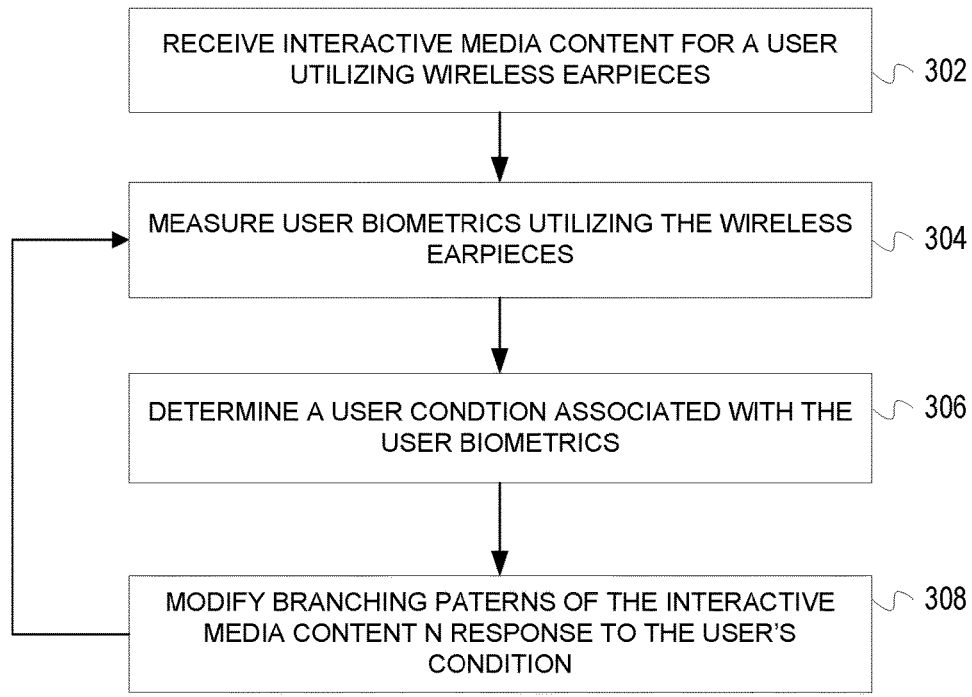
FIG. 3 is a flowchart of a process for managing interactive media content utilizing wireless earpieces in accordance with an illustrative embodiment.

FIG. 3 is a flowchart of a process for managing interactive media content utilizing wireless earpieces in accordance with an illustrative embodiment. In one embodiment, the process of FIG. 3 may be implemented by one or more wireless earpieces, such as the wireless earpieces 102 of FIG. 1. The method of FIG. 3 may be performed to communicate information by and between the wireless earpieces and an interactive book and/or a virtual reality headset. The wireless earpieces may synchronize playback of audio content associated with interactive media content. The wireless earpieces may perform sensor measurements of the user biometrics to determine the user's physical and emotional state. The wireless earpieces may also determine the location and position of the user to display accurate virtual information, such as location, position, angle and motion of the user's head, and so forth. In addition to the interactive book or virtual reality headset, the wireless earpieces may communicate with one or more electronic devices, such as a smart case, wireless devices, computing devices, entertainment devices, medical devices, or so forth, to perform the method of FIG. 3.

The process may begin with the wireless earpieces receiving interactive media content with the user utilizing wireless earpieces (step 302). The wireless earpieces may communicate directly or indirectly with an interactive book, virtual reality headset, virtual reality processing system, or other electronics to communicate the interactive media content to the user. As noted, the interactive media content may include any number of games, stories, communications, role-playing scenarios, trainings, or so forth. The user may select the interactive media content for playback utilizing any number of commands, such as file selections, icon selections, audio commands, tactile commands, gesture commands, or other input or combinations of input. The user or one or more remote parties or devices may select the interactive media content. During step 302, communication of the interactive media content is initiated between the virtual reality system and the wireless earpieces.

Next, the wireless earpieces measure user biometrics utilizing the wireless earpieces (step 304). The user biometrics may be measured utilizing any number of sensors to determine information, such as pulse rate, blood pressure, temperature, calories burned, voice characteristics, location, position, orientation, and other applicable user and environmental information. In another embodiment, the user biometrics may be determined utilizing any number of other devices in communication with the wireless earpieces. For example, cell phones, smart watches, smart bands, chest straps, headgear, vehicle components, virtual reality components, or so forth may communicate with the wireless earpieces.

Next, the wireless earpieces determine a user condition associated with the user biometrics (step 306). The user condition(s) may be determined utilizing information associated with the user biometrics. For example, any number of biometric thresholds may be utilized alone or in combination to determine the user condition. For example, heart rate, voice characteristics, and blood pressure may be utilized to determine that the user is scared. In some embodiments, the wireless earpieces may run through a training program or scenario to associate the user's biometrics with known conditions including emotional and physical states. In other embodiments, the wireless earpieces may periodically prompt the user to indicate his or her status for association with the user biometrics. A database of the fault, programs, or custom user biometrics, baseline readings, and thresholds may be utilized to determine the state of the user.

Next, the wireless earpieces modify branching patterns of the interactive media content in response to the user's condition (step 308). In one embodiment, during step 408, the wireless earpieces or the virtual reality system may select one of a number of branching patterns to implement based on the user's condition. The branching patterns may represent any number of variables, conditions, parameters, or outcomes that may be implemented as part of the interactive media content. The interactive media content may be varied by the wireless earpieces directly or may be implemented based on a command, instructions, application, or other feedback received from the wireless earpieces. For example, an interactive book or virtual reality system may implement the branching patterns in response to the user condition and status determined by the wireless earpieces based on the biometric readings, data, and information.

In one embodiment, before performing the process of FIG. 3, the wireless earpieces may be linked with the virtual reality headset. For example, the user may magnetically couple the wireless earpieces with the virtual reality headset. Each side of the virtual reality headset may include a connector corresponding to the left and right wireless earpieces. The wireless earpieces may include magnetic contacts that couple the two devices to communicate data as well as provide a power connection for powering the wireless earpieces utilizing power provided by the virtual reality headset (e.g., battery, power adapter, USB connection, etc.). As a result, the power capacity of the wireless earpieces is increased significantly. In another embodiment, either of the wireless earpieces or the virtual reality headset may include connectors and ports for physically connecting to one another. The two devices may also communicate utilizing an inductive connection between the wireless earpieces and the virtual reality headset. In another embodiment, the wireless earpieces and the connectors of the virtual reality headset may utilize short range communications, such as Bluetooth, NFMI, ANT+, or other radiofrequency communications to communicate. The wireless earpieces may be integrated with her connected to connectors, extensions, arms, the frame, or other portions of the virtual reality headset.

The wireless earpieces may also synchronize playback of audio content with visual content displayed by the virtual reality headset (altogether media content). As noted, the wireless earpieces may utilize any number of sensors to determine the location, velocity (e.g. linear, angular, etc.), position of the user (and the user's head), biometric condition (e.g., heart rate, blood oxygenation, temperature, etc.), and other information to adjust the exact timing, volume, tuning, balance, fade, and other audio effects communicated to the user by the speakers of the wireless earpieces. The wireless earpieces may also send or receive commands for synchronizing and managing the audio content played by the wireless earpieces with the visual content.

The information may be coordinated based on user actions, conditions, position, location, or so forth. For example, specific three dimensional noises may be played in each of the wireless earpieces corresponding to the left and right ears of the user to make the environment seem more realistic. Likewise, the volume and other audio effects may be varied to match the orientation of the user's head (or avatar) within a virtual environment. The audio content may include flags, timestamps, or other information for synchronizing playback. The synchronization of the audio and visual content may ensure that the user does not become disoriented, motion sick, or otherwise adversely affected.

The wireless earpieces communicate the audio content to the user has received from the virtual reality headset or virtual reality system. The audio content may be played based on synchronization information determined between the virtual reality headset and the wireless earpieces. For example, the left and right wireless earpieces may play distinct content based on the virtual reality environment with which the user is interacting. As a result, distinct sounds, volumes, and audio effects may be utilized by each of the wireless earpieces. As a result, the user is able to experience a unique virtual environment with corresponding sounds without significant increases in weight or other forces imposed upon the user by much larger sound systems.

The illustrative embodiments provide a system, method, and wireless earpiece(s) for performing self-configuration automatically or based on environmental conditions, detected events, activities, thresholds or user input. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 4:
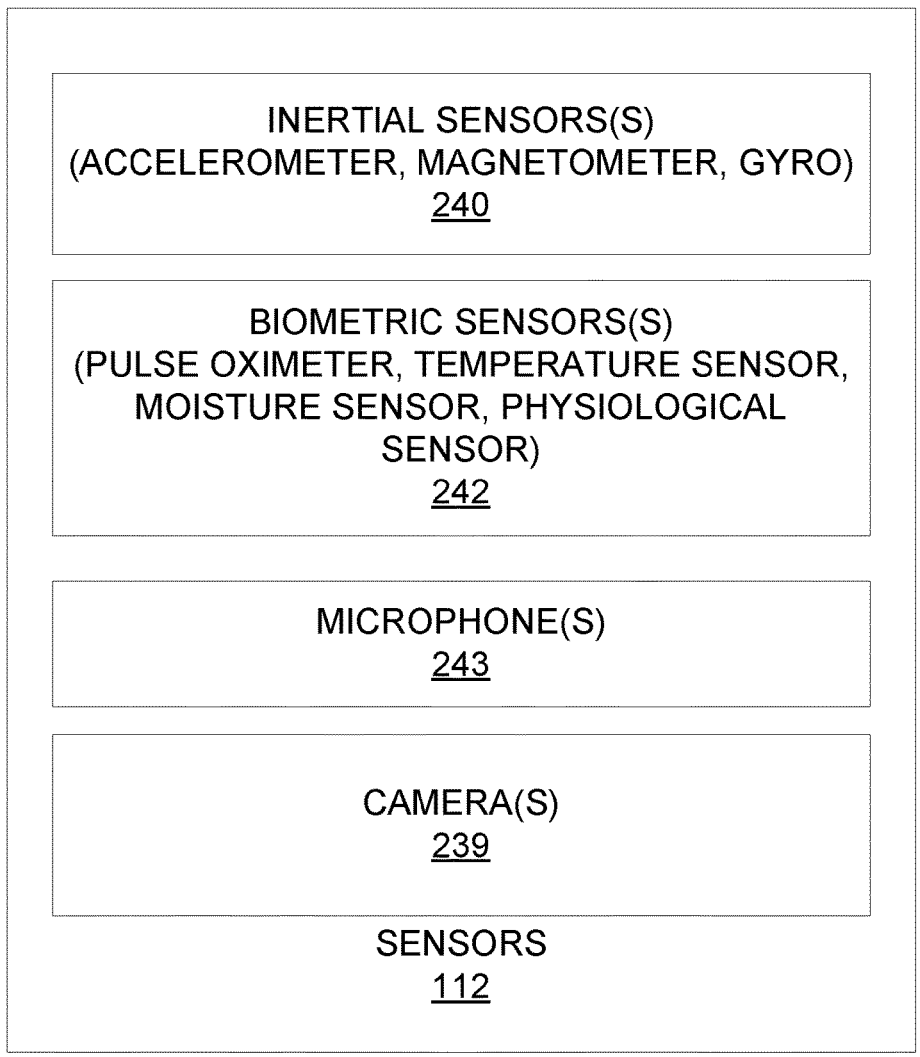
FIG. 4 depicts various types of sensors

FIG. 4 illustrates further examples of sensors 112 of the wireless earpiece. The sensors 112 may include one or more inertial sensors such as accelerometers, magnetometers, and/or gyros. The inertial sensors 240 may be used to track head position and movements of the user. The sensors 112 may further include one or more biometric sensors such as pulse oximeters, temperature sensors, perspiration sensors, or other types of physiological sensors. As previously explained, the biometric information may be used to track physiological indicators associated with stress which may coincide with different portions of a story arch, a particular character, game action or other elements within a story book or game. One or more microphones 243 are also shown. It is to be understood that in addition to detecting a voice of a user or within an environment, the microphones 243 may be used to sense more subtle sounds associated with a user such as breathing patterns or utterances indicative of their emotional connection with or reaction to an element of a storybook. One or more cameras may also be included for detecting additional information about a user or their environment. Of course, any number of other sensors may be present and the sensors need not be limited to those which are shown.

As previously explained information detected with one or more of the sensors may suggest taking different branching patterns. Different branching patterns may be taken for different reasons. For example, where a user as proclivity to become too intense to create physical or emotional issues when engaged in a story or game, branch patterns may be taken to reduce the intensity of the experience of a user such as by choosing branch patterns less likely to excite the user. In other instances, branch patterns may be taken to purposefully increase the intensity of the user. Thus, for the example if there are story elements which when encountered result in increased heart rate as detected with a heart rate sensor of one or more of the earpieces, increased perspiration as detected with a moisture sensor of one or more of the earpiece, more shallow breathing as detected with a microphone, then branches can be taken result which are consistent with this. Various models may be applied to predict a user's reactions to different branches based on their reaction to past branches either from the same interactive media content or from other interactive media content. Examples of models may include neural networks, genetic algorithms, fuzzy logic algorithms, or combinations thereof. Models may also be statistical in nature. For example different branch patterns may have weightings for different inferred emotional responses. Thus, if for a given population of people, certain branches tend to result in more excitement as inferred from heart rate or other biometric data, those branches may be given higher weightings than other branches. Then, when deciding between two branches of an interactive story or game, the branch with a weighting best associated with an emotional response of interest may be taken (e.g. higher to invoke a more intense emotional response). It is to be understood, that depending on the specific application, the specific interactive story, or other interactive content, and the inferred emotions sought to be increased or limited, different models may be used as appropriate to affect the desired outcome. It is also to be understood that objectives need not be binary in nature in that it may be desirable to increase emotional response to a point and then decrease emotional response for a time before increasing emotional response again.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for implementing interactive media content, comprising:
   linking a virtual reality system implementing the interactive media content with wireless earpieces, the wireless earpieces configured to fit into ears of a user, the wireless earpieces each having a processor, at least one speaker operably coupled to the processor, at least one microphone operably coupled to the processor and at least one biometric sensor operably coupled to the processor;
   receiving user input from the user at the wireless earpieces and commands the user input from the wireless earpieces to the virtual reality system to control the virtual reality system;
   receiving interactive media content for communication to a user from the virtual reality system through the wireless earpieces;
   measuring user biometrics utilizing the at least one biometric sensor of the wireless earpieces;
   determining by the processor a user condition associated with the user biometrics; and
   modifying branching patterns of an interactive story line and/or game of the interactive media content in response to the user condition.

2. The method of claim 1, wherein the virtual reality system includes at least a virtual reality headset and further comprising:
   synchronizing playback of audio content with visual content displayed by the virtual reality headset; and
   playing the audio content in response to receiving the audio content from the virtual reality headset.

3. The method of claim 1, wherein the interactive media content is a game or story.

4. The method of claim 1, further comprising:
   communicating with an interactive book; and
   managing the interactive media content communicated by the interactive book and the wireless earpieces in response to the user condition.

5. The method of claim 1, wherein the branching patterns are modified to reach a specified user condition.

6. The method of claim 1, wherein the interactive media content includes a plurality of alternatives that are selectable in response to the branching patterns.

7. The method of claim 2, further comprising:
   receiving additional sensor measurements from the virtual reality headset; and
   playing the audio content in response to the additional sensor measurements.

8. The method of claim 1, wherein the user condition indicates a physical state and emotional state of the user.

9. The method of claim 1, wherein the biometric information includes data from one or more sensors external to the wireless earpieces.

10. The method of claim 1, further comprising:
    synchronizing playback of audio content within the set of wireless earpieces with visual content displayed by the virtual reality headset; and
    playing the audio content in response to receiving the audio content from the virtual reality headset.

11. The method of claim 1, further comprising the step of controlling the virtual reality headset from the set of wireless earpieces.

12. A virtual reality system, comprising:
    a virtual reality headset for displaying a virtual reality environment to a user;
    wireless earpieces worn in ears of the user that receive interactive media content from the virtual reality headset for communication to a user through at least wireless earpieces, measure user biometrics utilizing biometric sensors of the wireless earpieces, determine a user condition associated with the user biometrics, and modify branching patterns of an interactive story line and/or dame of the interactive media content in response to the user condition.

13. The virtual reality system of claim 12, wherein the wireless earpieces are magnetically coupled to the virtual reality headset by the connectors, wherein the connectors are flexible connectors extending from the virtual reality headset to the wireless earpieces, and wherein the wireless earpieces receive the audio content and power through the flexible connectors utilizing inductive communications.

14. The virtual reality system of claim 12, wherein the wireless earpieces link the wireless earpieces with the virtual reality system including at least the virtual reality headset, synchronize playback of audio content with visual content displayed by the virtual reality headset, and play the audio content in response to receiving the audio content from the virtual reality headset.

15. The virtual reality system of claim 12, wherein the biometric information includes data from one or more sensors external to the wireless earpieces.

16. The virtual reality system of claim 12, wherein the virtual reality system selects one of a plurality of branching patterns in response to the user condition.

17. The virtual reality system of claim 12, wherein the branching patterns are modified to reach a specified user condition.

18. A method for implementing interactive media content, comprising:
- receiving interactive media content from a virtual reality headset for communication to a user through a set of wireless earpieces;
- measuring user biometrics utilizing sensors of the wireless earpieces;
- determining by a processor of the wireless earpieces a user condition associated with the user biometrics; and
- altering a story line or a game of the interactive media content in response to the user biometrics.

* * * * *

UNITED STATES PATENT AND TRADEMARK OFFICE
CERTIFICATE OF CORRECTION

PATENT NO.         : 10,216,474 B2
APPLICATION NO.    : 15/642545
DATED              : February 26, 2019
INVENTOR(S)        : Veniamin Milevski and Peter Vincent Boesen Page 1 of 1

It is certified that error appears in the above-identified patent and that said Letters Patent is hereby corrected as shown below:

In the Claims

Column 20, Claim 12, Line 46 change "dame" to --game--

Signed and Sealed this
Ninth Day of April, 2019

Andrei Iancu
*Director of the United States Patent and Trademark Office*